(12) United States Patent
Lien et al.

(10) Patent No.: US 11,693,495 B2
(45) Date of Patent: Jul. 4, 2023

(54) ACTIVE STYLUS

(71) Applicant: EMRight Technology Co., Ltd., Hsinchu County (TW)

(72) Inventors: Chien Chia Lien, Hsinchu County (TW); Ting-Cheng Lai, Hsinchu County (TW)

(73) Assignee: EMRight Technology Co., Ltd., Hsinchu County (TW)

( * ) Notice: Subject to any disclaimer, the term of this patent is extended or adjusted under 35 U.S.C. 154(b) by 0 days.

(21) Appl. No.: 17/837,045

(22) Filed: Jun. 10, 2022

(65) Prior Publication Data

US 2022/0397968 A1     Dec. 15, 2022

(30) Foreign Application Priority Data

Jun. 11, 2021    (TW) ................................ 110121369

(51) Int. Cl.
*G06F 3/0354* (2013.01)
*G01L 5/00* (2006.01)

(52) U.S. Cl.
CPC ........ *G06F 3/03545* (2013.01); *G01L 5/0038* (2013.01)

(58) Field of Classification Search
CPC .......................... G06F 3/003545; G01L 5/0038
USPC ........................................................ 345/179
See application file for complete search history.

(56) References Cited

U.S. PATENT DOCUMENTS

| 9,239,639 | B1* | 1/2016 | Vanderet | G06F 3/03545 |
| 2011/0241703 | A1* | 10/2011 | Fukushima | G06F 3/03545 |
| | | | | 324/661 |
| 2014/0306940 | A1* | 10/2014 | Fukushima | G06F 3/046 |
| | | | | 345/179 |
| 2015/0378456 | A1* | 12/2015 | Ho | G06F 3/03545 |
| | | | | 345/174 |
| 2017/0075440 | A1* | 3/2017 | Chang | G06F 3/03545 |
| 2018/0260048 | A1* | 9/2018 | Chang | G06F 3/03545 |

FOREIGN PATENT DOCUMENTS

| CN | 105829997 | 8/2016 |
| TW | 201040798 | 11/2010 |

* cited by examiner

*Primary Examiner* — Mark Edwards
(74) *Attorney, Agent, or Firm* — JCIPRNET

(57) ABSTRACT

An active stylus including a pen housing, a pen core module disposed in the pen housing, a control module disposed in the pen housing, and an elastic member assembled to the control module and the pen core module is provided. The pen core module has a first end and a second end opposite to each other. The first end is protruded out of the pen housing. The control module has a force sensing element, and an elastic force of the elastic member drives the second end of the pen core module to be abutted to the force sensing element seamlessly.

15 Claims, 4 Drawing Sheets

ACTIVE STYLUS

CROSS-REFERENCE TO RELATED APPLICATION

This application claims the priority benefit of Taiwan application serial no. 110121369, filed on Jun. 11, 2021. The entirety of the above-mentioned patent application is hereby incorporated by reference herein and made a part of this specification.

BACKGROUND

Technical Field

The disclosure relates to an active stylus.

Description of Related Art

With the advancement and development of technology, there are many electronic devices in the market that use touch panel or touch pad as the operation interface. Users usually use their fingers to operate on the touch panel, but sliding fingers on the touch panel is easy to cause too much friction due to the wide finger contact area, which is not suitable for mass or fast input, and also may occur in case of accidental touch, so there is a stylus introduced.

The existing stylus can be divided into active and passive types, in which the active stylus sends a signal from the signal transmitting circuit inside the pen, and the corresponding touch panel (or touch pad) receives the signal and determines the coordinates of the contacted position and the touch pressure.

Generally speaking, the existing active stylus is equipped with a conductive rubber on the pen tip, and the conductive rubber is pressed against the force sensing element so that the conductive rubber is deformed and generates a change in capacitance or resistance with the force sensing element when pressed, and the touch signal is generated accordingly. However, due to the characteristics of the material, the conductive rubber often faces the situation of insufficient deformation, so when using the conductive rubber, there are idle operations in the touching path of the pen core to ensure that the deformation of the conductive rubber is sufficient to produce the change in capacitance or change in resistance, but this gives the user a bad feeling of collapse when operating, and the existence of idle operations also means that the components are in a fragmented rather than compact configuration, which also easily has a negative impact on the overall structural strength.

SUMMARY

The disclosure provides an active stylus, capable of eliminating unnecessary idle operation when a pen core is pressed by means of a compact configuration of structural members.

The active stylus of the disclosure includes a pen housing, a pen core module, a control module, and an elastic member. The pen core module is disposed in the pen housing and has a first end and a second end opposite to each other, and the first end extends out of the pen housing. The control module is disposed in the pen housing and has a force sensing element. The elastic member is assembled to the control module and the pen core module. An elastic force of the elastic member drives the second end of the pen core module to be abutted to the force sensing element seamlessly.

According to an embodiment of the disclosure, a direction of the elastic force is consistent with a direction of pressure on the force sensing element.

According to an embodiment of the disclosure, the pen core module includes a main body, an abutting element, and a buffer. The main body has the first end. The abutting element is movably inserted into the main body, and the abutting element has the second end. The buffer is abutted between the main body and the abutting element.

According to an embodiment of the disclosure, the main body has a protrusion, and a coil portion of the elastic member sleeves the main body and abuts to the protrusion.

According to an embodiment of the disclosure, the abutting element is of rigid construction.

According to an embodiment of the disclosure, the elastic member has a coil portion and a rod portion, the coil portion sleeves the pen core module and located between the first end and the second end, and the rod portion extends from the coil portion and is electrically connected to the control module.

According to an embodiment of the disclosure, the control module further has a circuit board, the force sensing element is disposed on the circuit board, and the rod portion of the elastic member is welded to the circuit board.

According to an embodiment of the disclosure, the circuit board has an opening and a pad disposed in the openings, and a bend of the rod portion is sunk into and supported by the opening and is welded to the pad.

According to an embodiment of the disclosure, an orthographic projection of the coil portion on the pen core module is located within a length range of an orthographic projection of the rod portion on the pen core module.

According to an embodiment of the disclosure, the pen core module and the elastic member have conductivity respectively, and the pen core module is electrically connected to the control module through the elastic member.

According to an embodiment of the disclosure, the pen core module is of rigid construction at the second end.

According to an embodiment of the disclosure, the force sensing element is a digital output force sensing element formed by a capacitive microelectromechanical systems (MEMS) structure.

Based on the above, in the active stylus of the disclosure, the elastic member is assembled to the control module and the pen core module, and the elastic force of the elastic member drives the second end of the pen core module to be abutted to the force sensing element seamlessly, so that the pen core module and the force sensing element of the control module in a compact configuration of structural contact. In this way, during touching and operating of the active stylus, there will not be any idle operation between the pen core module and the force sensing element of the control module due to the conventional conductive rubber. This allows the active stylus to generate a direct touch response with a more direct touch action, without giving the user the undesirable sensation of a collapsed pen core.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
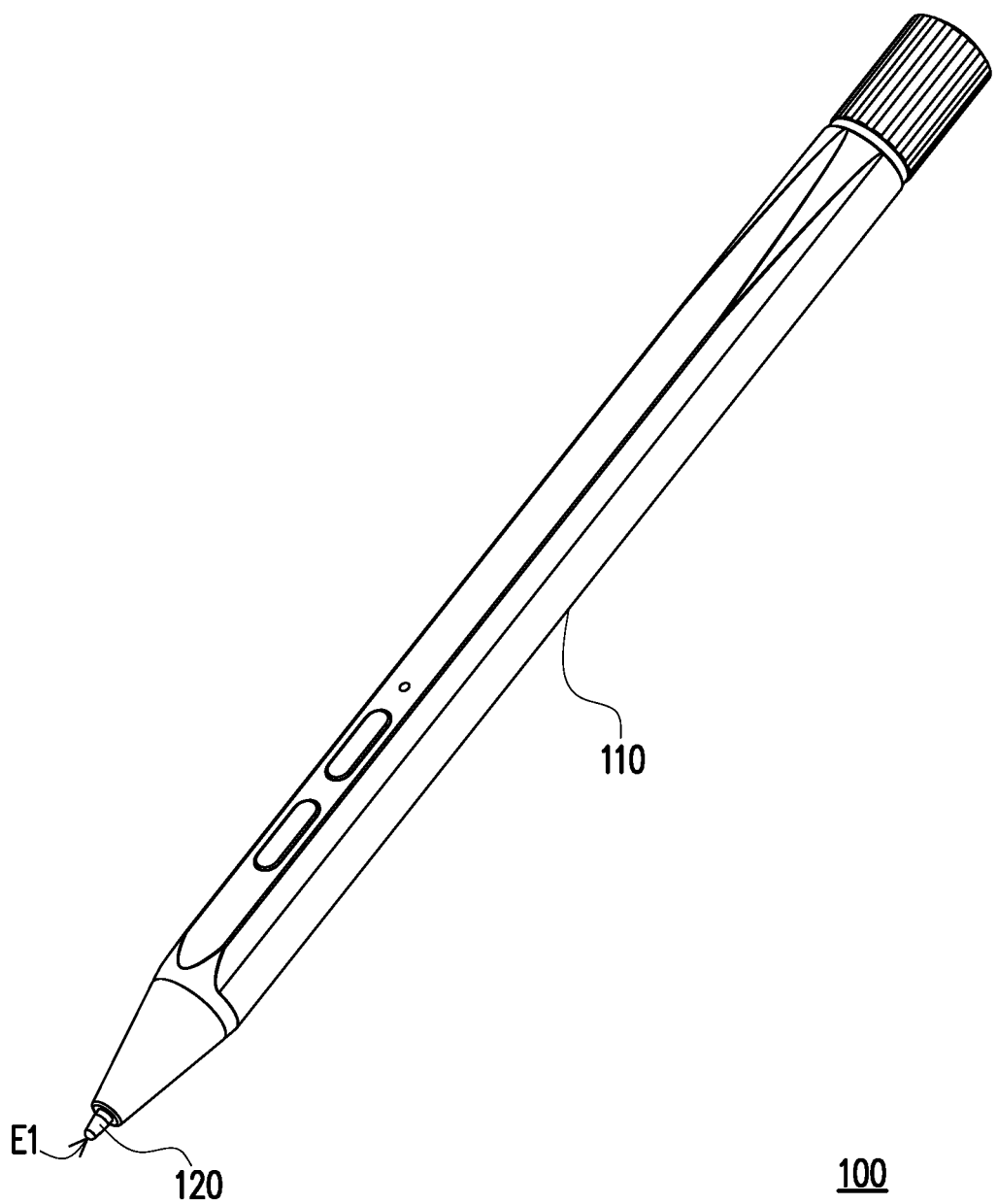
FIG. 1 is a schematic view of an active stylus according to an embodiment of the disclosure.
Figure 2:
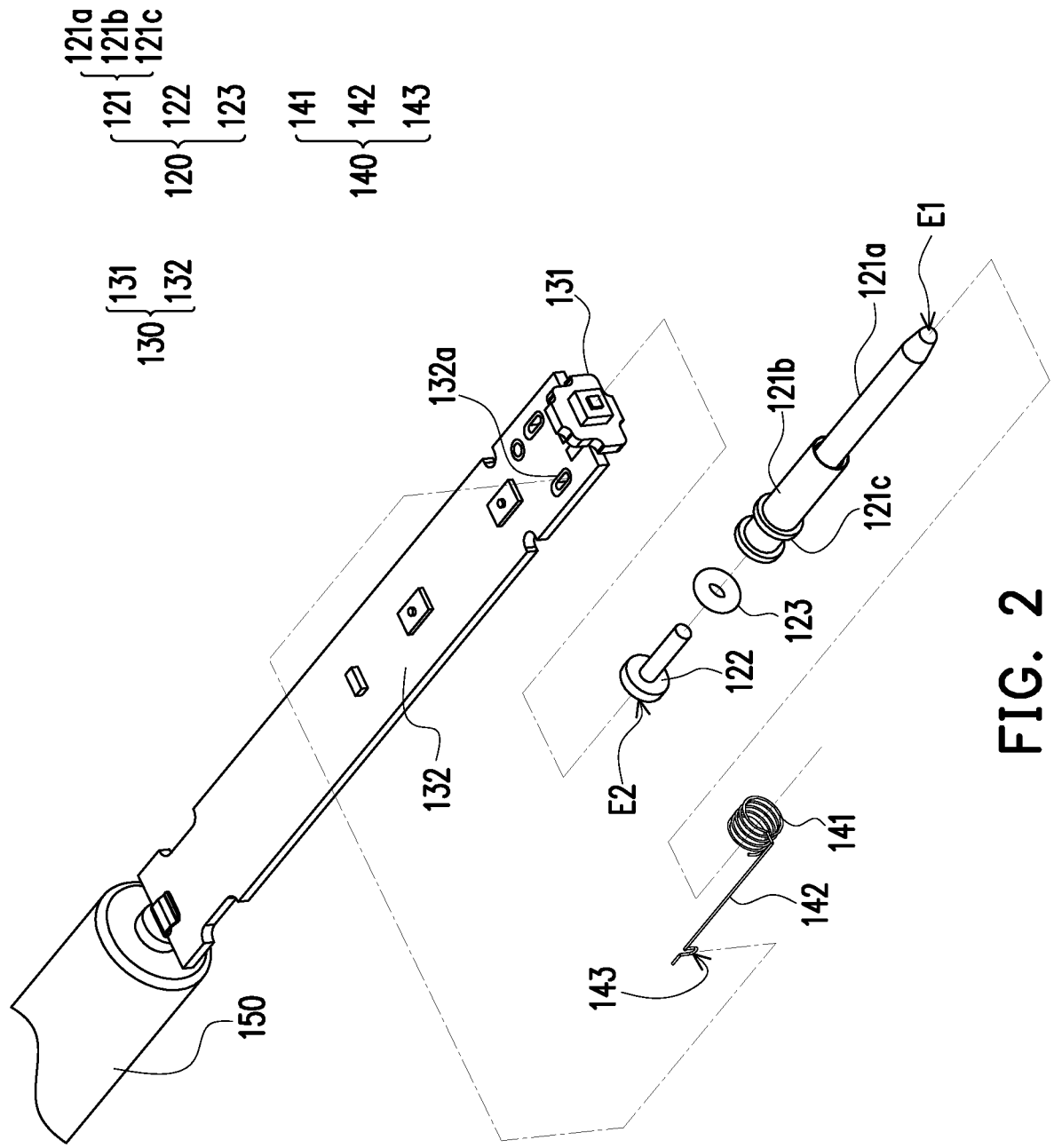
FIG. 2 is an exploded view of some components of the active stylus in FIG. 1.

FIG. 1 is a schematic view of an active stylus according to an embodiment of the disclosure. FIG. 2 is an exploded view of some components of the active stylus in FIG. 1. Referring to FIG. 1 and FIG. 2 at the same time, according to this embodiment, an active stylus 100 includes a pen housing 110, a pen core module 120, a control module 130, an elastic member 140, and a battery 150. The pen core module 120 is disposed in the pen housing 110 and has a first end E1 and a second end E2 opposite to each other. The first end E1 extends out of the pen housing 110. The control module 130 is disposed in the pen housing 110 and has a force sensing element 131. The elastic member 140 is assembled to the control module 130 and the pen core module 120. An elastic force of the elastic member 140 drives the second end E2 of the pen core module 120 to be abutted to the force sensing element 131 seamlessly.

Further, the pen core module 120 includes a main body 121, an abutting element 122, and a buffer 123. The main body 121 has the first end E1. The abutting element 122 is movably inserted into the main body 121, and the abutting element 122 has the second end E2. The buffer 123 is abutted between the main body 121 and the abutting element 122.

Figure 3:
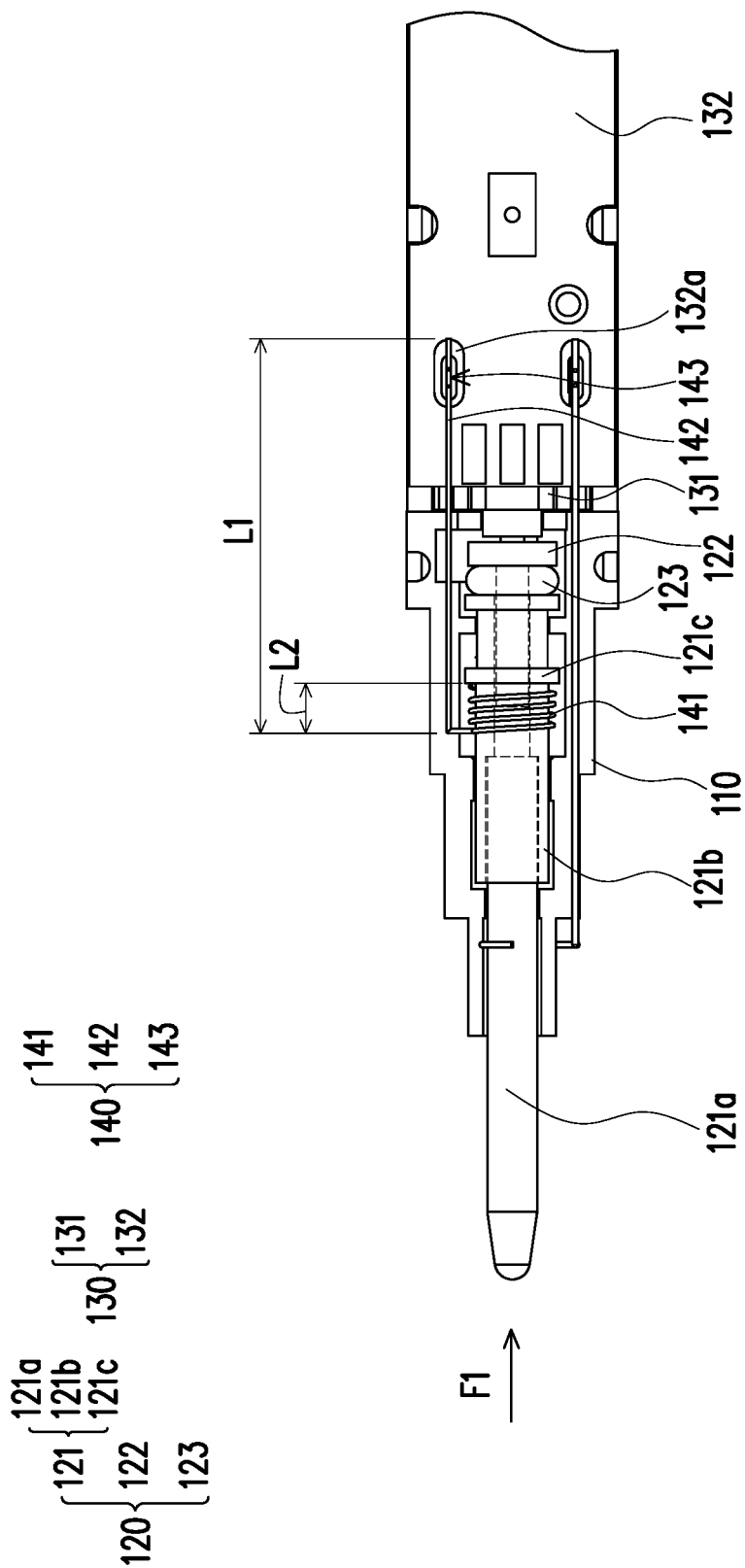
FIG. 3 is a partial schematic view of the active stylus of FIG. 1.

FIG. 3 is a partial schematic view of the active stylus of FIG. 1. Part of the structure of the pen housing 110 is omitted here, and the relative relationship between the control module 130, the pen core module 120, and the elastic member 140 in the pen housing 110 can be more clearly identified. Referring to FIG. 2 and FIG. 3 at the same time, according to this embodiment, the main body 121 includes a pen core 121a and a holder 121b. The pen core 121a is inserted into the holder 121b, and the buffer 123 is, for example, an O-ring made of rubber. The abutting element 122 is in a form of a bolt, and a rod of the abutting element 122 is movably inserted into the holder 121b after passing through the O-ring and is opposite to the pen core 121a.

Furthermore, the elastic member 140 has a coil portion 141 and a rod portion 142. The coil portion 141 sleeves the holder 121b of the main body 121 of the pen core module 120, and is located between the first end E1 and the second end E2. The rod portion 142 extends from the coil portion 141 and is electrically connected to the control module 130. Here, the control module 130 further includes a circuit board 132 (and the electronic elements thereon). The circuit board 132 is carried in the internal structure of the pen housing 110. The force sensing element 131 is disposed (and electrically connected to) on the circuit board 132 to correspond to the pen core module 120, and the circuit board 132 has an opening and a pad 132a disposed in the opening. One end of the rod portion 142 of the elastic member 140 extends from the coil portion 141, and the other end forms a bend 143. The bend 143 is sunk into and supported by the opening and is welded to the pad 132a. The drawing of the welded material is omitted here to clearly identify the correspondence between the rod portion 142 and the pad 132a at the opening. At the same time, the pen core module 120 and the elastic member 140 have conductivity respectively, so that the pen core module 120 may be electrically connected to the control module 130 through the elastic member 140. Here, one side of the circuit board 132 opposite to the pen core module 120 is electrically connected to the battery 150 also disposed in the pen housing 110 (shown in FIG. 1).

In this way, when the user operates the active stylus 100, the pen core module 120 is subjected to different levels of pressure with different writing postures and handwriting, and is directly subjected to and sense pressure from the abutting element 122 through the force sensing element 131. A computational processing unit of the control module 130 (e.g., a processor disposed on the circuit board 132, not shown here) is configured to receive an electrical signal transmitted by the force sensing element 131, calculate pressure of the pen tip, and convert the pressure level into a corresponding pressure level. After that, different pressure levels are converted into different frequencies or digital signals, and a transformer unit (not shown) on the circuit board 132 converts the frequencies or signals into a voltage required by the pen core module 120, which is transmitted to the coil portion 141 through the bend 143 and the rod portion 142 of the elastic member 140 sequentially, and then to the pen core module 120 for transmission to a touch panel (or a touch pad) to form corresponding handwriting.

It should be noted that, according to this embodiment, the force sensing element 131 is a digital output force sensing element formed by a capacitive microelectromechanical systems (MEMS) structure with better sensitivity of 700 lsb/N, resolution of 0.14 g/lsb, and linearity of less than 1% in a force range of 0 to 10N. Accordingly, the force sensing element 131 may directly respond to and sense a very small external force pressure, and furthermore, the abutting element 122 of the pen core module 120 is of rigid construction, so pressure on the pen core module 120 at the first end E1 may be directly responded to, avoiding the generation of the idle operation as mentioned in the previous techniques. In other words, the pen core module 120 of this embodiment may sense the pressure by the pressing of the rigid construction, without worrying about the sensing error caused by the deformation of the conventional conductive rubber. The rigid construction means that the abutting element 122 of the pen core module 120 will not be deformed during operating and touching of the active stylus 100, and is separated from the conventional conductive rubber.

Furthermore, as shown in FIG. 3, an orthographic projection L2 of the coil portion 141 of the elastic member 140 on the pen core module 120 is located within a length range of an orthographic projection L1 of the rod portion 142 on the pen core module 120 (here, the orthographic projections L1 and L2 are marked outside of the components for easy identification). That is to say, starting from the bend 143 of the elastic member 140 and passing through the rod portion 142 toward the left side of FIG. 3, the coil portion 141 is substantially wound and extended in the reverse direction (toward the right side of FIG. 3) until abutting a protrusion 121c disposed on the holder 121b. In this way, a direction F1 of the elastic force applied by the elastic member 140 to the pen core module 120 is consistent with a direction of pressure on the force sensing element 131, so as to achieve a compact configuration of the components, that is, the effect of "driving the second end E2 of the pen core module 120 to be abutted to the force sensing element 131 seamlessly". Further, the pen core module 120 is driven by the elastic force applied by the elastic member 140, and since the buffer 123 is clamped between the abutting element 122 and the holder 121b of the main body 121, an buffering effect provided by the buffer 123 further ensures that the abutting element 122 can be abutted to the force sensing element 131 seamlessly. At the same time, the buffering effect may also absorb more impact force when the active stylus 100 is dropped from a height, so as to significantly reduce the risk of breaking of the pen core module 120 due to the fall.

Figure 4:
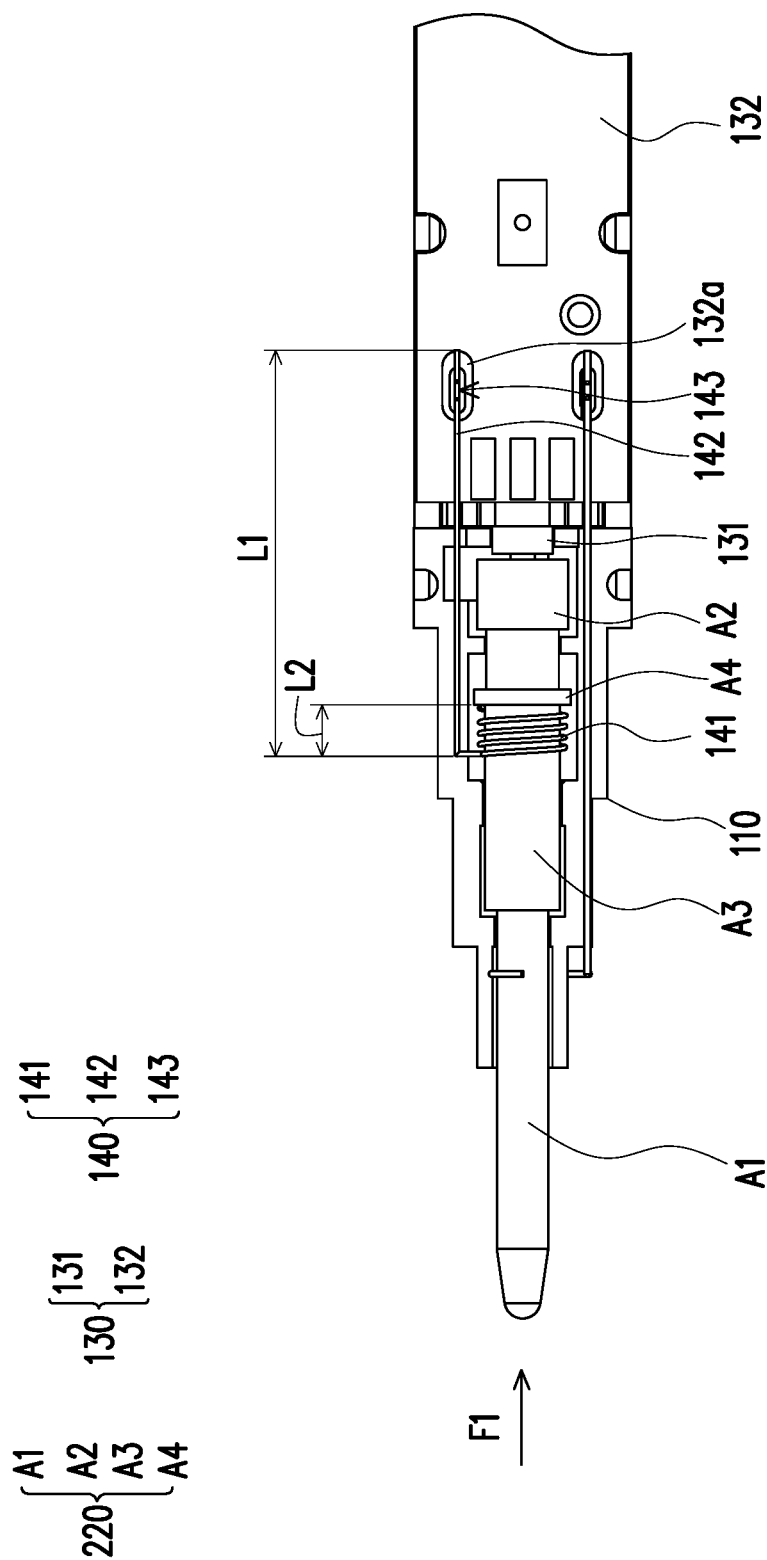
FIG. 4 is a partial schematic view of an active stylus according to another embodiment of the disclosure.

FIG. 4 is a partial schematic view of an active stylus according to another embodiment of the disclosure. Referring to FIG. 4, FIG. 4 is similar to the embodiment shown in FIG. 3, but differs in that a pen core module 220 of an active stylus 200 according to this embodiment is of an integrated structure. In FIG. 4, from left to right, a pen core A1, a holder A3, a protrusion A4, and an abutting element A2 are shown. The pen core A1, the holder A3, and the protrusion A4 are the same as the pen core 121a, the holder 121b, and the protrusion 121c, and is therefore equivalent to changing the configuration of the separate components of the abutting element 122 and the buffer 123 to the integrated structure of this embodiment. At the same time, because the force sensing element 131 has the ability to directly respond to and sense a very small external force pressure, the pen core module 220 can be regarded as a rigid body, and the pen core module 220 can also directly transmit the pressure of the active stylus 200 to the force sensing element 131 during operating and touching.

To sum up, in the active stylus according to the embodiments of the disclosure, the elastic member is assembled to the control module and the pen core module, and the elastic force of the elastic member drives the second end of the pen core module to be abutted to the force sensing element seamlessly, so that the pen core module and the force sensing element of the control module in a compact configuration of structural contact.

Since the direction of the elastic force applied by the elastic member to the pen core module is consistent with the direction of the force sensing element, the elastic force may be effective in effectively and seamlessly abutting the pen core module and, in particular, the abutting element, towards the force sensing element. In this way, in addition to allowing the pressure of the pen core module to respond (transfer) directly to the force sensing element when operating and touching, the user does not need to provide additional force to resist the elastic force of the elastic member when operating the stylus, in order to achieve an effort-saving effect.

Accordingly, during touching and operating of the active stylus, there will not be any idle operation between the pen core module and the force sensing element of the control module due to the conventional conductive rubber. This allows the active stylus to generate a direct touch response with a more direct touch action, without giving the user the undesirable sensation of a collapsed pen core.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. An active stylus comprising:
    a pen housing;
    a pen core module disposed in the pen housing, wherein the pen core module has a first end and a second end opposite to each other, and the first end is protruded out of the pen housing;
    a control module disposed in the pen housing, wherein the control module has a force sensing element;
    an elastic member assembled to the control module and the pen core module, wherein an elastic force of the elastic member drives the second end of the pen core module to be abutted to the force sensing element seamlessly;
    a main body having the first end;
    an abutting element movably inserted into the main body, wherein the abutting element has the second end; and
    a buffer abutted between the main body and the abutting element,
    wherein the main body has a protrusion, and a coil portion of the elastic member sleeves the main body and abuts to the protrusion.

2. The active stylus according to claim 1, wherein a direction of the elastic force is consistent with a direction of pressure on the force sensing element.

3. The active stylus according to claim 1, wherein the abutting element is of rigid construction.

4. The active stylus according to claim 1, wherein the elastic member has a rod portion, the coil portion sleeves the pen core module, and the rod portion extends from the coil portion and is electrically connected to the control module.

5. The active stylus according to claim 4, wherein the control module further has a circuit board, the force sensing element is disposed on the circuit board, and the rod portion of the elastic member is welded to the circuit board.

6. The active stylus according to claim 5, wherein the circuit board has an opening and a pad disposed in the opening, a bend of the rod portion is sunk into and supported by the opening and is welded to the pad.

7. The active stylus according to claim 4, wherein an orthographic projection of the coil portion on the pen core module is located within a length range of an orthographic projection of the rod portion on the pen core module.

8. The active stylus according to claim 1, wherein the pen core module and the elastic member have conductivity respectively, and the pen core module is electrically connected to the control module through the elastic member.

9. An active stylus comprising:
    a pen housing;
    a pen core module disposed in the pen housing, wherein the pen core module has a first end and a second end opposite to each other, and the first end is protruded out of the pen housing;
    a control module disposed in the pen housing, wherein the control module has a force sensing element; and
    an elastic member assembled to the control module and the pen core module, wherein an elastic force of the elastic member drives the second end of the pen core module to be abutted to the force sensing element seamlessly,
    wherein the elastic member has a coil portion and a rod portion, the coil portion sleeves the pen core module, and the rod portion extends from the coil portion and is electrically connected to the control module, wherein an orthographic projection of the coil portion on the pen core module is located within a length range of an orthographic projection of the rod portion on the pen core module.

10. The active stylus according to claim 9, wherein a direction of the elastic force is consistent with a direction of pressure on the force sensing element.

11. The active stylus according to claim 9, wherein the pen core module comprises:
   a main body having the first end;
   an abutting element movably inserted into the main body, wherein the abutting element has the second end; and
   a buffer abutted between the main body and the abutting element.

12. The active stylus according to claim 11, wherein the abutting element is of rigid construction.

13. The active stylus according to claim 9, wherein the control module further has a circuit board, the force sensing element is disposed on the circuit board, and the rod portion of the elastic member is welded to the circuit board.

14. The active stylus according to claim 13, wherein the circuit board has an opening and a pad disposed in the opening, a bend of the rod portion is sunk into and supported by the opening and is welded to the pad.

15. The active stylus according to claim 9, wherein the pen core module and the elastic member have conductivity respectively, and the pen core module is electrically connected to the control module through the elastic member.

\* \* \* \* \*